United States Patent
Cormode et al.

(10) Patent No.: US 8,078,710 B2
(45) Date of Patent: Dec. 13, 2011

(54) METHOD AND APPARATUS FOR MONITORING FUNCTIONS OF DISTRIBUTED DATA

(75) Inventors: Graham Cormode, Summit, NJ (US); Ke Yi, Kowloon (CN)

(73) Assignee: AT&T Intellectual Property I, LP, Atlanta, GA (US)

( * ) Notice: Subject to any disclaimer, the term of this patent is extended or adjusted under 35 U.S.C. 154(b) by 994 days.

(21) Appl. No.: 11/963,005

(22) Filed: Dec. 21, 2007

(65) Prior Publication Data

US 2010/0312872 A1    Dec. 9, 2010

(51) Int. Cl.
*G06F 15/173*    (2006.01)

(52) U.S. Cl. ............... 709/223; 709/224; 707/1; 707/2; 707/9; 707/103

(58) Field of Classification Search .................. 709/224, 709/223; 707/1, 2, 9, 103
See application file for complete search history.

(56) References Cited

U.S. PATENT DOCUMENTS

| 5,758,338 A * | 5/1998 | Faloutsos et al. ..................... 1/1 |
| 5,950,185 A * | 9/1999 | Alon et al. ..................... 707/758 |
| 2009/0031175 A1 * | 1/2009 | Aggarwal et al. ............... 714/47 |

* cited by examiner

*Primary Examiner* — Tina Nguyen
(74) *Attorney, Agent, or Firm* — Hoffmann & Baron, LLP

(57) ABSTRACT

This invention discloses continuous functional monitoring of distributed network activity using algorithms based on frequency moment calculations given by $$F_p = \Sigma_i m_i^p.$$

The frequency moment calculations are used to raise an alarm when a value exceeds a certain threshold. Frequency moments for p=0, 1, and 2 are described.

20 Claims, No Drawings

METHOD AND APPARATUS FOR MONITORING FUNCTIONS OF DISTRIBUTED DATA

FIELD OF THE INVENTION

This invention discloses continuous functional monitoring of distributed network activity using algorithms based on frequency moment calculations.

BACKGROUND

Functional monitoring problems are fundamental in distributed systems, in particular sensor networks, where minimization of communication is necessary. Functional monitoring also concerns problems in communication complexity, communication theory, and signal processing.

In traditional sensor systems such as smart homes and elsewhere, security sensors are carefully laid out and configured, and there is a convenient power source. The straightforward way to monitor a phenomenon is to take measurements every few time instants, send them to a central site, and use back-end systems to analyze the entire data trace.

In contrast, modern sensor networks, addressed in this invention, are more ad hoc and mobile. A modern sensor network may be distributed arbitrarily, operate on battery power, and have expensive bandwidth costs (e.g., via wireless communication). A battery operated device needs to conserve their power for long use between charging periods. Further, these sensors have some memory and computing power. Hence the sensors can perform local computations and be more careful in usage of radio for communication, since radio use is the biggest source of battery drain. In this scenario, collecting all the data from sensors to correctly calculate a function in the back-end is wasteful, and a direct approach is to design protocols which will trigger an alarm when a threshold is exceeded, and the emphasis is on minimizing the communication during the battery lifetime.

Moreover, even in a hard wired (i.e., not wireless) environment, there is a bandwidth cost to transmitting data, and minimization of communication of purely overhead functions is a generally desirable feature.

In this context, variations of functional monitoring have been proposed as "reactive monitoring" (in networking, see M. Dilman and D. Raz, "Efficient reactive monitoring," *IEEE Infocom*, 2001), and "distributed triggers" (in databases, see G. Cormode and M. Garofalakis, "Sketching streams through the net: Distributed approximate query tracking," *Intl. Conf. Very Large Data Bases*, 2005; G. Cormode, S. Muthukrishnan, and W. Zhuang, "What's different: Distributed, continuous monitoring of duplicate resilient aggregates on data streams," *Intl. Conf. on Data Engineering*, 2006; and G. Comiode, S. Muthukrishnan, and W. Zhuang, "Conquering the divide: Continuous clustering of distributed data streams," *Intl. Conf. on Data Engineering*, 2007).

Prior work has considered many different functions, and typically presents algorithms with correctness guarantees, but no nontrivial communication bounds. Some of the above work takes a distributed streaming approach where in addition to optimizing the bits communicated, the algorithms also attempt to optimize the space and time requirements of each of the sensors.

SUMMARY OF THE INVENTION

This invention provides a method for continuous distributed monitoring of computer network activity, focusing on frequency moments, given by formula (I).

$$F_p = \Sigma_i m_i^p \quad (I)$$

where $F_p$ is frequency moment of order p, and $m_i$ is the frequency of item i from all sits.

Estimating the frequency moments has become the keystone problem in streaming algorithms since the seminal paper of Alon et al. (N. Alon, Y. Matias, and M. Szegedy. "The space complexity of approximating the frequency moments," *Journal of Computer and System Sciences*, 58:137-147, 1999). In particular, the first three frequency moments (p=0, 1, 2) are useful in this invention. $F_1$ is a simple summation of all elements. $F_0$ corresponds to the number of distinct elements, and $F_2$ is based on the square of the number of elements. All three have applications to a wide variety of monitoring situations in order to test when a certain value passes a critical threshold, such as system load in a distributed system.

In one aspect of this invention, network devices are programmed to report a particular network function to a network manager (i.e., a person), where the decision to transmit the report is based on a frequency moment calculation performed locally on the reporting device. By careful selection of the parameters of the calculation, a minimum amount of data can be reported that provides a pre-selected degree of timeliness and accuracy to the network manager. The transmission of a report to a person alerts that person to a situation on the network, for example, a certain percentage of network errors. On being alerted, a manager can take, for example, remedial steps to correct a problem or otherwise address the situation, which if left unattended, could cause a deterioration in network conditions, in a set of circumstances where human intervention is required.

In another aspect of this invention, frequency moment calculations are employed to report network statistics, such as how many packets are routed, where the packets originate geographically, where they are addressed geographically, or how many malformed packets have been transmitted. For any such statistical parameter, the decision to make a report is based on frequency moment calculations performed on a local device, such as a router or server.

In another aspect of this invention, the reports from local devices, computed with a frequency moment calculation, are transmitted to a network manager, which can make a decision on a course of action. The network manager can be a server which makes an automated decision, for example to bypass a malfunctioning router. Alternatively, a report can be made to a work station where a person can make manual changes.

In an embodiment of this invention, a method for continuous distributed monitoring of computer network activity is provided, with a computer network including a central coordinator computer and a set of distributed remote devices, wherein the central coordinator computer monitors and reports on network activity; selecting a network activity of interest; programming remote devices to report on the selected activity according to a frequency moment calculation, as noted above. In some embodiments, $p \geq 1$ and the frequency moment algorithm proceeds in two or more rounds. In further embodiments, each remote device monitors a function of the selected network activity, and sends a bit to a central coordinator when the value of the function increases above a pre-determined threshold. In a related aspect, each remote device monitors a function of a device connected to the network, and sends a bit to a central coordinator when the value of the function increases above a pre-determined threshold.

In another aspect of this invention, the frequency moment algorithm proceeds in two or more rounds, where each remote device monitors a function selected from the selected network activity and a function of a device connected to the network; and each remote device sends a bit to a central coordinator when the value of the function increases above a pre-determined threshold, and the coordinator completes a round after receiving a pre-determined number of bits from the set of remote devices, and the coordinator collects information from all remote devices at the end of each round, where said information summarizes the data received at each remote device, and the summary information is in the form of a sum or sketch of data values, and where the coordinator determines that a global threshold has been reached based on a combination of summaries.

In another aspect of this invention, $F_1$ is monitored, where the frequency moment calculation proceeds in a single round, and where each remote device waits until it receives a pre-determined number of elements and then simulates the tossing of a biased coin, with true randomness or with a pseudo-random number generator, and where the device sends a bit to the coordinator if the result of the coin toss is heads; and where the coordinator determines that a global threshold has been reached after receiving a pre-determined quantity of bits from the remote devices.

Where the frequency moment is $F_0$, the frequency moment calculation may proceed in a single round. In such a case, each remote device randomly selects one of two hash functions f or g, and each device evaluates the selected hash function based on data received on the selected network activity, and the second hash function is evaluated only if certain criteria are met in the first hash function; and where, if an item with the same hash value has not already been observed by the remote site, then that hash value is sent to the coordinator; and the central coordinator reports that a global threshold has been reached when the number of distinct hash values received exceeds a pre-determined number.

Where the frequency moment is $F_2$, the algorithm may proceed in two phases of rounds, which are in turn divided into sub-rounds. In this case, the remote devices and coordinator use sketch algorithms to estimate the current $L_2$ norm of vectors to varying levels of accuracy, and where each round uses a pre-determined threshold so that each device sends a bit to the coordinator when its local updates during the current round have an $L_2$ noun which exceeds this threshold; and
 (a) where in the first phase, the coordinator collects sketches from each device after receiving a pre-determined number of bits; and
 (b) if the summation of the sketches causes the estimate of the current global $F_2$ to exceed a pre-determined fraction of the global threshold, then the method proceeds to the second phase, where the second phase comprises the division of each round into sub-rounds, where each sub-round is completed on the receipt of a pre-determined threshold of a number of bits; on the completion of each sub-round, each remote site transmits an approximate sketch to the coordinator; if the approximate sketch is less than a pre-defined threshold, a new sub-round is initiated; if the approximate sketch is equal to or exceeds a pre-defined threshold, the coordinator changes its output to and terminates the algorithm.

In another aspect involving the frequency moment is $F_2$, the frequency moment calculation proceeds in a two phases of rounds, where $F_2$ does not exceed a certain fraction of the global threshold at the completion of the first phase, and where, during the second phase, $F_2$ is monitored until it is within a certain range of the global threshold.

In another aspect involving the frequency moment is $F_2$, the algorithm employs two phases of rounds. In the first phase, there is one sub-round per round, and the coordinator collects sketches from each device with a communication cost based on the number of devices;
 (i) if the number of sketches equal or exceeds a pre-determined threshold, the coordinator ends the round and computes a new threshold of sketches required to end a round;
 (ii) if the new threshold equals or exceeds the previous threshold by a pre-determined fraction, then the calculation proceeds to phase two, otherwise another round of the first phase is performed; and
 (iii) first phase rounds are performed until the threshold permits advancing to the second phase.

In the second phase, the coordinator collects sketches from remote sites with a communication cost based on the number of remote devices divided by an error factor; and where
 (i) the remote sites continuously monitor the selected activity, and transmit sketches to the coordinator if the activity exceeds a pre-defined threshold; and
 (ii) when the server receives a number of sketches equal to the number of remote devices, a sub-round is completed and the remote sites transmit an approximate sketch to the coordinator;
 (iii) if the approximate sketch is less than or equal to a pre-defined threshold, the coordinator starts a new sub-round;
 (iv) if the approximate sketch is greater than a pre-defined threshold, the coordinator ends the round, and if the number of sketches exceeds the threshold of sketches required to end the algorithm, the coordinator changes its output to 1 and the algorithm is terminated. In this aspect, the pre-determined fraction noted above is greater than 1, for example, 9/8 or 5/4.

This invention further discloses a method for raising an alarm in a computer network with a set of remote reporting devices and a coordinator server, wherein the coordinator server has an initial output of 0, with continuous distributed monitoring of a function on the network or a function at a remote device. The continuous distributed monitoring comprises:
 (a) a series of rounds and a set of frequency vectors;
 (b) a predefined threshold at which a remote device reports a bit to the coordinator if the frequency vectors exceed a pre-defined threshold; and
 (c) where the coordinator changes its output to 1 if a pre-determined number of bits is received by the coordinator, and where the change in output constitutes an alarm on the network.

The method of raising an alarm in the aforementioned paragraph may further constitute an alarm that alerts a person to a situation on the network, or alternatively, the alarm may alert an automated process to a situation on the network.

DETAILED DESCRIPTION

As described herein, continuous distributed functional monitoring problems are "$(k, f, \tau, \epsilon)$" problems, where k represents the number of players, $f$ is a function, $\tau$ is a threshold, and $\epsilon$ is an error factor. In the broadest sense, a $(k, f, \tau, \epsilon)$ problem is designed to change its output, such as raising an alarm, when a threshold $\tau$ is reached, where the players are observed continually and in real time.

In this invention, $(k, f, \tau, \epsilon)$ problems can be used to supervise and monitor computer networks, and generate reports in real time based on a pre-selected network function. An important feature in network supervision, monitoring, and control is balancing the accuracy of network reports, the timeliness of the reports, and the bandwidth usage required to make sufficient reports.

The purpose of providing real time reports is to make rapid changes to correct problems or fine tune network performance in real time, to minimize network slowdowns or stoppages, and increase performance. For example, if an excess load is detected of traffic entering a network, such as at a rush hour, additional devices can brought online to handle the load, or lower priority activities can be stopped to handle higher priority traffic.

In this invention, aggregate network functions are observed that are amenable to statistical analysis, such as network load, origin or destination of packets, and error rates. As such, a certain amount of error in the accuracy of reports can be tolerated. Thus, in an aspect of this invention, a pre-determined error factor can be employed, such as a 1% or a 10% error rate, within which errors are acceptable.

In any network reporting function, minimization of bandwidth is an important objective. Any reporting function can be considered an overhead activity, so the object of a reporting activity is to transmit the minimum amount of information necessary to make reports that meet the pre-determined parameters of accuracy and timeliness. Minimizing bandwidth is especially desirable in wireless or battery powered devices, where transmission of data consumes power and contributes to depletion of batteries.

As an illustration of the parameters of this invention, consider a simple case where there are two observers, Alice and Bob, who watch goods entering or leaving a warehouse through separate doors, and a manager, Carol. Alice and Bob do not speak with each other, but each observer has a two way communication channel with Carol. The objective of this system is to design a system to minimize the communication of each observer with Carol, while at the same time providing Carol with real time and accurate information on the flow of goods in an out of the warehouse. Mathematically, this can be expressed as $|C(t)|=|A(t)|+|B(t)|$, where t is time, and $C(t)$ is a monitoring function. If $b_A(t)$ is the total number of bits sent from Alice to Carol, and $b_B(t)$ is the total number of bits sent from Bob to Carol, then the goal is to minimize $b(t)$, where $bt=b_A(t)+b_B(t)$.

In the most trivial case, Alice and Bob simply send a report (bit) every time an item enters or leaves the warehouse. In this case, $bt=|A(t)|+|B(t)|$. Of greater interest is the more complex case, where given $\epsilon$, Carol's task is to output 0 whenever $C(t) \leq (1-\epsilon)\tau$, and to output 1 whenever $C(t) > \tau$, for a threshold $\tau$. Put differently, if the threshold is exceeded, an alarm is raised.

Several communication procedures in principle can achieve the goal of providing reports while minimizing communication between the observers and the manager (the manager is also referred to herein as a coordinator). A simple method is a coin toss, where, for example, Alice and Bob each flip a coin each time an item enters the warehouse and send Carol a report when the coin shows heads.

Another procedure is the "GLOBAL" method, where Alice and Bob know a rough estimate of $\Delta=\tau-C(t')$ from some prior time t', and each observer sends a bit whenever the number of items they have observed exceeds $\Delta/2$. Carol updates Alice and Bob with estimates when she gets a bit update and the new value of $\Delta$ is computed and used.

Another procedure is the "LOCAL" method, where Alice and Bob each create a model for arrival times of items and communicate the model parameters to Carol. The observers send bits to summarize differences when their current data significantly differs from their models.

This invention discloses functional monitoring problems generally in which there are $k \geq 2$ sites, and we wish to monitor $C(t)=f(A_1(t) \cap \ldots \cap A_k(t))$ where $A_i(t)$ is the multiset of items collected at site i by time t, and $f$ is a monotonically nondecreasing function in time. There are two variants: threshold monitoring (determining when $C(t)$ exceeds a threshold $\tau$) and value monitoring (providing a good approximation to $C(t)$ at all times t). Value monitoring directly solves threshold monitoring, and running $O((1/\epsilon) \log T)$ instances of a threshold monitoring algorithm for thresholds $\tau=1$, $(1+\epsilon)$, $(1+\epsilon)^2, \ldots$, T solves value monitoring with relative error $1+\epsilon$. Thus, the two variants differ by at most a factor of $O(1/\epsilon) \log T$). This disclosure will focus on threshold monitoring, which will be referred to as $(k, f, \tau, \epsilon)$ problems.

Thus, in one aspect, this invention provides a set of methods for monitoring particular functions of distributed data. For example, consider monitoring the number of malformed packets observed by a collection of routers in a large network, and wishing to raise an alert if the number of such packets exceeds some large quantity, say one million. This invention allows this to be monitored using an amount of communication which is much smaller than simply alerting a central monitor for every observed bad packet (very costly), while also avoiding periodic polling of routers for values (also costly, and potentially slow to respond). The communication cost of this monitoring is tightly bounded, while guaranteeing very high accuracy. In comparison to solutions to similar problems described in the literature, our solutions offer significantly less communication (up to an order of magnitude less and minimal computation power.

Accordingly, this invention is concerned with monitoring a function over a distributed set of computing devices and associated inputs. While the inventors have given solutions to such problems in the past, the methods and apparatus presented here apply to the same problems and present significant improvements in the cost of the monitoring. For example, consider a network of routers each observing their local traffic, where the network manager wishes to compute some function over the global traffic. Alternatively, consider a sensor network monitoring environmental conditions, such as stock in a warehouse or battlefield conditions. The function being monitored could simply be a sum of values observed, a count of the number of distinct objects observed globally, or the root-mean-square of a large number of values. Prior work (including work of that of the inventors here) has addressed these problems and given solutions which reduce the communication over the simple solution of pushing every single piece of information up to a centralized location.

In another aspect, this invention is applicable to situations where exact answers are unnecessary, such as reports of aggregate network performance or approximate error rates. In these types of reports, approximations with accuracy guarantees suffice. Thus, the functions of the invention have a built in error factor, $\epsilon$. The use of a report of approximate data with an accuracy guarantee allows a tradeoff between accuracy and communication cost, i.e., bandwidth and processing resources required for the report.

In another aspect, this invention is useful for reporting on complex network functions. In the case of simple functions, periodic polling can often suffice. Thus, SNMP can poll traffic at a coarse granularity. However, a sampling method such as a periodic poll cannot effectively report on a holistic aggregate of data, such as data on network performance or error rates. An approach to reporting aggregate data is to carefully balance the period of polling with the communication cost of the report. Too infrequent polling will cause unnecessary delays in event observations. Too frequent polling has high communication costs, including high bandwidth usage. An additional problem with too frequent polling could lie in remote battery powered sensors that require battery power to send data, perhaps wirelessly. Overly frequent reports will deplete the batteries needlessly.

The methods of this invention address these concerns by intelligently reducing communications to the minimum bandwidth necessary to provide guaranteed error rates and guaranteed rapid response to events.

In signal processing, the emerging area of compressed sensing redefines the problem of signal acquisition as that of acquiring not the entire signal, but only the information needed to reconstruct the few salient coefficients using a suitable dictionary. These results can be extended to (k, $f$, $\tau$, $\epsilon$) problems where the function is the salient coefficients needed to reconstruct the entire signal. See S. Muthukrishnan, "Some algorithmic problems and results in compressed sensing," *Allerton Conference*, 2006. Further, the Muthukrishnan paper extended compressed sensing to functional compressed sensing where we need to only acquire information to evaluate specific functions of the input signal. Except for preliminary results in Muthukrishnan for quantiles, virtually no results are known for (k, $f$, $\tau$, $\epsilon$) problems.

In computer science, there are communication complexity bounds that minimize the bits needed to compute a given function $f$ of inputs at any particular time over k parties. They do not, however, minimize the bits needed continuously over the entire time. These bounds are one-shot problems. The central issue in the continuous problems disclosed here is how often, and when, to repeat parts of such protocols over time to minimize the overall number of bits transferred.

The "streaming model" (see Alon et al., cited above) has received much attention in recent years. There are many functions $f$ that can be computed up to 1±$\epsilon$ accuracy in streaming model, using poly(1/$\epsilon$, log n) space. This includes streaming algorithms for problems such as estimating frequency moments. There have been several works in the database community that consider the streaming model under the distributed setting, which is essentially the same as the model disclosed here. Subsequently several functional monitoring problems have been considered in this distributed streaming model, but the devised solutions typically are heuristics-based, the worst-case bounds are usually large and far from optimal. See G. Cormode and M. Garofalakis, "Sketching streams through the net: Distributed approximate query tracking," *Intl. Conf. Very Large Data Bases*, 2005; G. Cormode, M. Garofalakis, S. Muthukrishnan, and R. Rastogi, "Holistic aggregates in a networked world: Distributed tracking of approximate quantiles," *ACM SIGMOD Intl. Conf. Management of Data*, 2005; G. Cormode, S. Muthukrishnan, and W. Zhuang, "Conquering the divide: Continuous clustering of distributed data streams," *Intl. Conf. on Data Engineering*, 2007; and R. Keralapura, G. Cormode, and J. Ramamirtham, "Communication-efficient distributed monitoring of thresholded counts," *ACM SIGMOD Intl. Conf. Management of Data*, 2006. In this disclosure, improved upper bounds for some basic functional monitoring problems are provided.

Accordingly, on one aspect, this invention provides a method for continuous distributed monitoring of computer network activity, focusing on frequency moments, given by formula (I).

$$F_p = \Sigma_i m_i^p \qquad (I)$$

where $F_p$ is frequency moment of order p, and $m_i$ is the frequency of item i from all sites.

Estimating the frequency moments has become the keystone problem in streaming algorithms since the seminal paper of Alon et al. (cited above). In particular, the first three frequency moments, where p=0, 1, or 2 are useful in this invention. Briefly, $F_1$ represents a simple summation of all elements, $F_0$ corresponds to the number of distinct elements, and $F_2$ is based on the square of the number of elements, and has found many applications such as surprise index, join sizes, etc.

Frequency moment calculations have previously been applied to analysis of data in databases, such as characteristics and distribution of data in large data sets. See, for example, Faloutsos et al., in U.S. Pat. No. 5,758,338, and Alon, et al. in U.S. Pat. No. 5,950,185.

Table 1 summarizes the results of bounds presented in this method. The method of the present invention employs the continuous bounds, particularly the upper bounds, since an objective of the instant invention is minimization of data transfer at the upper bound necessary to convey the necessary information with the smallest amount of data transfer. This method is mainly concerned with minimizing the communication cost of reporting aggregate network functions.

TABLE 1

Summary of the communication complexity for one-shot and continuous threshold monitoring of different frequency moments. The "randomized" bounds are expected communication bounds for randomized algorithms with failure probability $\delta < \frac{1}{2}$

| Moment | Continuous | | One-shot | |
|---|---|---|---|---|
| | Lower bound | Upper bound | Lower bound | Upper bound |
| $F_0$, randomized | $\Omega(k)$ | $\tilde{O}\left(\frac{k}{\varepsilon^2}\right)$ | $\Omega(k)$ | $\tilde{O}\left(\frac{k}{\varepsilon^2}\right)$ |
| $F_1$, deterministic | $\Omega\left(k \log \frac{1}{\varepsilon k}\right)$ | $O\left(k \log \frac{1}{\varepsilon}\right)$ | $\Omega\left(k \log \frac{1}{\varepsilon k}\right)$ | $O\left(k \log \frac{1}{\varepsilon}\right)$ |
| $F_1$, randomized | $\Omega\left(\min\{k, \frac{1}{\varepsilon}\}\right)$ | $O\left(\min\{k \log \frac{1}{\varepsilon} \cdot \frac{1}{\varepsilon^2} \log \frac{1}{\delta}\}\right)$ | $\Omega(k)$ | $O\left(k \log \frac{1}{\varepsilon\sqrt{k}}\right)$ |
| $F_2$, randomized | $\Omega(k)$ | $\tilde{O}(k^2/\varepsilon + (\sqrt{k}/\varepsilon)^3)$ | $\Omega(k)$ | $\tilde{O}\left(\frac{k}{\varepsilon^2}\right)$ |

For the (k, $F_1$, $\tau$, $\epsilon$) problem, this method shows the deterministic bounds of O(k log 1/$\epsilon$) and $\Omega$(k log 1/$\epsilon$k)1; and randomized bounds of $\Omega$(min{k, 1/$\epsilon$}) and O(1/$\epsilon^2$ log 1/$\delta$), independent of k, where $\delta$ is the algorithm's probability of failure. Hence, randomization can give significant asymptotic improvement, and curiously, k is not an inherent factor. These bounds improve the previous result of $O(K/\epsilon \log \tau/k)$ in the paper by R. Keralapura, G. Cormode, and J. Ramamirtham, "Communication-efficient distributed monitoring of thresholded counts," *ACM SIGAIOD Intl. Conf. Management of Data*, 2006.

For the $(k, F_0, \tau, \epsilon)$ problem, this method shows a (randomized) upper bound of $O(k/\epsilon^2)$, which improves on the previous result of $O(k^2/\epsilon^3 \log n \log 1/\delta)$, presented in the paper by G. Cormode, S. Muthukrishnan, and W. Zhuang "What's different: Distributed, continuous monitoring of duplicate resilient aggregates on data streams," *Intl. Conf. on Data Engineering*, 2006. This method also gives a lower bound of $\Omega(k)$.

For the $(k, F_2, \tau, \epsilon)$ problem, this method presents an upper bound of $\tilde{O}(k^2/\epsilon+(k^{-2}/\epsilon)^3)$, improving on the previous result of $\tilde{O}(k^2/\epsilon^4)$ published by G. Cormode and M. Garothlakis, "Sketching streams through the net: Distributed approximate query tracking," *Intl. Conf. Very Large Data Bases*, 2005. This method also gives a lower bound of $\Omega(k)$. The algorithm is a more sophisticated form of the "GLOBAL" algorithm (see above), with multiple rounds, using different "sketch summaries" at multiple levels of accuracy. The $\tilde{O}$ notation suppresses logarithmic factors in n, k, m, t, $1/\epsilon$, and $1/\delta$.

Problem Formulation

Consider a sequence of elements $A=(a_1, \ldots, a_m)$, where $a_i \in \{1, \ldots, n\}$. Let $m_i = |\{j : a_j = i\}|$ be the number of occurrences of i in A, and define the p-th frequency moment of A as $F_p(A) = \Sigma^n_{i=1} m^p_i$ for each $p \geq 0$. In the distributed setting, the sequence A is observed in order by $k \geq 2$ remote sites $S_1, \ldots, S_k$ collectively, i.e., the element $a_i$ is observed by exactly one of the sites at time instance i. There is a designated coordinator that is responsible for deciding if $F_p(A) \geq \tau$ for some given threshold $\tau$. Determining this at a single time instant t yields a class of one-shot queries, but in this invention, the interest is in continuous monitoring $(k, f, \tau, \epsilon)$ queries, where the coordinator must correctly answer over the collection of elements observed thus far $(A(t))$, for all time instants t.

In the approximate version of these problems, for a parameter where $0 < \epsilon \leq \frac{1}{4}$, the coordinator should output 1 to raise an alert if $F_p(A(t)) \geq \tau$ and output 0 if $F_p(A(t)) \leq (1-\epsilon)\tau$. If $F_p$ is in between, the coordinator can answer either output, but will not change the output from the previous time t. Since the frequency moments never decrease as elements are received, the continuous-monitoring problem can also be interpreted as the problem of deciding a time instance t, at which point we raise an alarm, such that $t_1 \leq t \leq t_2$, where $t_1 = \arg \min_t \{F_p(A(t)) > (1-\epsilon)\tau\}$ and $t_2 = \arg \min_t \{F_p(A(t)) \geq \tau\}$. The continuous algorithm terminates when such at is determined.

We assume that the remote sites know the values of $\tau$, $\epsilon$, and n in advance, but not m. The cost of an algorithm is measured by the number of bits that are communicated. We assume that the threshold $\tau$ is sufficiently large to simplify analysis and the bounds. Dealing with small $\tau$'s is mainly technical: we just need to carefully choose when to use the naive algorithm that simply sends every single element to the coordinator.

A simple observation implies that the continuous-monitoring problem is almost always as hard as the corresponding one-shot problem: for any monotone function $f$, an algorithm for $(k, j, \tau, \epsilon)$ functional monitoring that communicates $g(k, n, m, \tau\epsilon)$ bits implies a one-shot algorithm that communicates $g(k, n, m, \tau, \epsilon) + O(k)$ bits.

General Algorithm for $F_p$ where $p \geq 1$

This is a general algorithm based on each site monitoring only local updates. The algorithm gives initial upper bounds, which we improve for specific cases in subsequent sections.

Upper hounds are more important than lower hounds in this invention, since our goal is to minimize communication traffic at the upper bound of a given function.

The algorithm proceeds in multiple rounds, based on the generalized GLOBAL method, where the network manager updates the remote devices in real time with parameters on which the decision to make a report are based. Thus, whenever the coordinator receives a report, the remote devices are iteratively updated, changing the threshold required to make a report.

Let $u_i$ be the frequency vector $(m_1, \ldots, m_n)$ at the beginning of round i. In round i, every site keeps a copy of $u_i$ and a threshold $t_i$. Let $v_{ij}$ be the frequency vector of recent updates received at site j during round i. Whenever the impact of $v_{ij}$ causes the $F_p$ moment locally to increase by more than $t_i$ (or multiples thereof), the site informs the coordinator. After the coordinator has received more than k such indications, it ends the round, collects information about all k vectors $v_{ij}$ from sites, computes a new global state $u_i+1$, and distributes it to all sites.

More precisely, the round threshold is defined as $t_i = \frac{1}{2}(\tau - \|u_i\|_p^p)k^{-p}$, chosen to divide the current "slack" uniformly between sites. Each site j receives a set of updates during round i, which we represent as a vector $v_{ij}$. During round i, whenever $\lfloor \|u_i + v_{ij}\|_p^p / t_i \rfloor$ increases, site j sends a bit to indicate this (if this quantity increases by more than one, the site sends one bit for each increase). This formula means that $\|u_i + v_{ij}\|_p^p / t_i$ is rounded down to the nearest whole integer. Sending a bit only when $\|u_i + v_{ij}\|_p^p / t_i$ increases by a whole integer ensures the necessary accuracy with fewer messages sent from sites j to the coordinator than if a message was sent every time the referenced quantity changed. After the coordinator has received k bits in total, it ends round i and collects $v_{ij}$ (or some compact summary of $v_{ij}$) from each site. It computes $u_i+1 = u_i + \Sigma^k_{j=1} v_{ij}$, and hence $t_i+1$, and sends these to all sites, beginning round i+1. The coordinator changes its output to 1 when $\|u_i\|_p^p \geq (1-\epsilon/2)\tau$, and the algorithm terminates.

Consider the case where p=1. The upper bound is $O(k \log 1/\epsilon)$ messages of counts being exchanged. In fact, we can give a tighter bound: the coordinator can omit the step of collecting the current $v_{ij}$'s from each site, and instead just sends a message to advance to the next stage. The value of $t_i$ is computed simply as $2^{-1-i}\tau/k$, and the coordinator has to send only a constant number of bits to each site to signal the end of round i. Thus, we obtain a bound of $O(k \log 1/\epsilon)$ bits. This an easier calculation than the scheme presented in R. Keralapura, G. Cormode, and J. Ramamirtham, "Communication-efficient distributed monitoring of thresholded counts," *ACM SIGMOD Intl. Coni Management of Data*, 2006, which used an upper bound of $O(k/\epsilon \log \tau/\kappa)$.

Next, consider the case of p=2. In order to concisely convey information about the vectors $v_{ij}$ we make use of "sketch summaries" of vectors. See Alon, et al., cited above. These sketches have the property that (with probability at least $1-\delta$) they allow $F_2$ of the summarized vector to be estimated with relative error $\epsilon$, in $O(1/\epsilon^2) \log \tau \log 1/\delta$ bits. We can apply these sketches in the above protocol for p=2, by replacing each instance of $u_i$ and $v_{ij}$ with a sketch of the corresponding vector. Note that we can easily perform the necessary arithmetic to form a sketch of $u_i+v_{ij}$ and hence find (an estimate of) $\|u_i+v_{ij}\|_2^2$. In order to account for the inaccuracy introduced by the approximate sketches, we must carefully set the error parameter $\epsilon'$ of the sketches. Since we compare the change in $\|u_i+v_{ij}\|_2^2$ to $t_i$, we need the error given by the sketch—which is $\epsilon' \|u_i+v_{ij}\|_2^2$—to be at most a constant fraction of $t_i$, which can be as small as $(\epsilon r)/2$. Thus we need to set $\epsilon'=O(\epsilon/k^2)$. Putting this all together gives the total communication cost of $\tilde{O}(k^6/\epsilon^2)$.

Randomized/Improved Bounds for $F_1$

The simplest case is monitoring $F_1$, which is the sum of the total number of elements observed. As noted above, O(k log $1/\epsilon$) bits is a deterministic algorithm for monitoring $F_1$. Thus, any deterministic algorithm that solves (k, $F_1$, $\tau$, $\epsilon$) functional monitoring has to communicate $\Omega$(k log $(1/\epsilon k)$) bits.

A randomized algorithm can be shown for (k, $F_1$, $\tau$, $\epsilon$) functional monitoring with error probability at most $\delta$ that communicates $O((1/\epsilon^2) \log(1/\delta))$ bits. The algorithm is derived from a careful implementation of the coin toss procedure, with an error probability of ⅓. By running O(log $1/\delta$) independent instances and raising an alarm when at least half of the instances have raised alarms, we amplify to success probability $1-\delta$, as required. Every time a site receives $\epsilon^2\tau$ (ck) elements, where c is some constant to be determined later, it sends a signal to the coordinator with probability 1/k. The server raises an alarm as soon as it has received $c/\epsilon^2 - c/(2\epsilon)$ such signals, and terminates the algorithm. Choosing c=96 makes both probabilities at most ⅙, as desired.

A randomized algorithm is better than a deterministic algorithm for a large enough $\epsilon$. In addition, for any $\epsilon < ¼$, any probabilistic protocol for (k, $F_1$, $\tau$, $\epsilon$) functional monitoring that errs with probability smaller than ½ has to communicate $\Omega(\min \{k, 1/\epsilon\})$ bits in expectation.

Bounds for $F_0$

We know that the $F_1$ problem can be solved deterministically and exactly, by setting $\epsilon=1/\tau$, and communicating O(k log $\tau$) bits. For any $p \neq 1$, the same arguments of Proposition 3.7 and 3.8 in Alon et al. (cited above) apply to show that both randomness (Monte Carlo) and approximation are necessary for the $F_p$ problem in order to get solutions with communication cost better than $\Omega(n)$ for any $k \geq 2$. So we only need to consider probabilistic protocols that err with some probability $\delta$.

For monitoring $F_0$, we can generalize the sketch published by Z. Bar-Yossef, T. S. Jayram, R. Kumar, D. Sivakumar, and L. Trevisan, "Counting distinct elements in a data stream," *RANDOM*, 2002, in a distributed fashion.

The basic idea is that, since the $F_0$ sketch changes "monotonically", i.e., once an entry is added, it will never be removed, we can communicate to the coordinator every addition to all the sketches maintained by the individual sites. Thus, for any $\epsilon \leq ¼$, $n \geq k^2$, any probabilistic protocol for (k, $F_0$, $\tau$, $\epsilon$) functional monitoring that errs with probability smaller than ½ has to communicate $\Omega(k)$ bits in expectation.

In this model, there is a randomized algorithm for the (k, $F_0$, $\tau$, $\epsilon$) functional monitoring problem with error probability at most $\delta$ that communicates $O(k(\log n + (1/\epsilon^2) \log (1/\epsilon))$ bits. An algorithm can be shown with an error probability of ⅓. This can be driven down to $\delta$ by running O(log $1/\delta$) independent copies of the algorithm.

If t is defined as the integer such that $48/\epsilon^2 \leq \tau/2^t < 96/\epsilon^2$, the coordinator first picks two random pairwise independent hash functions $f:[n] \to [n]$ and $g: \to [6 \cdot (96/\epsilon^2)^2]$, and sends them to all remote sites. This incurs a communications cost of O(k (log n+log $1/\epsilon$))=O(k log n) bits. Next, each remote site evaluates $f(a_i)$ for every incoming element $a_i$, and tests of the last t bits of $f(a_i)$ are all zeros. If so, the remote site evaluates $g(a_i)$. There is a local that contains all g( ) values for such elements. If $g(a_i)$ is not in the buffer, we add $g(a_i)$ to the buffer, and send it to the coordinator. The coordinator also keeps a buffer of all unique g( ) values received, and outputs 1 whenever the number of elements in the buffer exceeds $(1-\epsilon/2)\tau/2^t$. Since each g( ) value takes O(log $1/\epsilon$) bits, the bound in the theorem easily follows.

Bounds for $F_2$

The $F_2$ monitoring algorithm has a communication cost of $\tilde{O}(k^2/\epsilon + k^{3/2}/\epsilon^3)$. This is an improvement over the bound from the prior art, reported in G. Cormode and M. Garofalakis, "Sketching streams through the net: Distributed approximate query tracking," *Intl. Conf. Very Large Data Bases*, 2005.

$F_2$ presents a more complex situation than $F_0$ or $F_1$. The $F_2$ algorithm has two phases in this method. At the end of the first phase, we make sure that the $F_2$ is between ¾ $\tau$ and $\tau$; while in the second phase, we more carefully monitor $F_2$ until it is in the range $((1-\epsilon)\tau, \tau)$.

Each phase is divided into multiple rounds. In the second phase, each round is further divided into multiple sub-rounds to allow for more careful monitoring with minimal communication. We use sketches such that with probability at least $1-\delta$, they estimate $F_2$ of the sketched vector within $1\pm\epsilon$ using $O(1/\epsilon^2 \log n \log 1/\delta)$ bits. See Alon, cited above. Initially, assume that all sketch estimates are within their approximation guarantees. At a later stage, $\delta$ will be set to ensure only a small probability of failure over the entire computation.

Algorithm. We proceed in multiple rounds, which are in turn divided into subrounds. Let $u_i$ be the frequency vector of the union of the streams at the beginning of the ith round, and $\hat{u}^2_i$ be an approximation of $u^2_i$. In round i, we use a local threshold $t_i=(\tau-\hat{u}^2_i)^2/64 k^2 \tau$. Let $v_{ijl}$ be the local frequency vector of updates received at site j during subround l of round i, and let $w_{il}=\tau^k_{j=1} v_{ijl}$ be the total increment of the frequency vectors in subround l of round i. During each (sub)round, each site j continuously monitors its $v^2_{ijl}$, and sends a bit to the server whenever $[v^2_{ijl}/t_i]$ increases.

Phase one. In phase one, there is only one subround per round. At the beginning of round i, the server computes a 5/4 overestimate $\hat{u}^2_i$ of the current $u^2_i$, i.e., $u^2_i \leq \hat{u}^2_i \leq 5/4 u^2_i$. This can be done by collecting sketches from all sites with a communication cost of O(k log n). Initially $\hat{u}^2_i = u^2_i = 0$. When the server has received k bits in total from sites, it ends the round by computing a new estimate $\hat{u}^2_{i+1}$ for $\hat{u}^2_{i+1}$. If $\hat{u}^2_{i+1} \geq 15/16 \tau$, then we must have $u^2_{i+1} \geq \hat{u}^2_{i+1}/(5/4) \geq ¾ \tau$, so we proceed to the second phase. Otherwise the server computes the new $t_{i+1}$, broadcasts it to all sites, and proceeds to the next round of phase one.

Phase two. In the second phase, the server computes a $(1+\epsilon/3)$-overestimate $\hat{u}^2_i$ at the start of each round by collecting sketches from the sites with a communication cost of $O(k/\epsilon \log n)$. The server keeps an upper bound $\hat{u}^2_{i,l}$ on $u^2_{i,l}$, the frequency vector at the beginning of the l-th subround in round i.

As above, during each sub-round, each site/continuously monitors its $v^2_{ijl}$, and sends a bit to the server whenever $[v^2_{ijl}/t_i]$ increases. When the server has collected k bits in total, it ends the sub-round. Then, it asks each site j to send a $(1\pm½)$-approximate sketch for $v^2_{ijl}$. If $\hat{u}^2_{i,l+1}+3 k \|\hat{u}^2_{i,l+1}\|\sqrt{t_i} < \tau$, then the server starts another sub-round, l+1. If not, then the round ends, and the server computes a new $\hat{u}^2_{i+1}$ for $u^2_{i+1}$. If $\hat{u}^2_{i+1} \geq (1-⅔\epsilon)\tau$, the server changes its output to 1 and terminates the algorithm. Otherwise, it computes the new $t_{i+1}$, sends it to all sites, and starts the next round.

CONCLUSIONS

For functional monitoring problems (k, $f$, $\tau$, $\epsilon$), this work had the surprising results that for some functions, the communication cost is close to or the same as the cost for one-time computation of $f$, and that the cost can be less than the number of participants, k. Our results for $F_2$ make careful use of compact sketch summaries, switching between different levels of approximation quality to minimize the overall cost. These algorithms are more generally useful, since they immediately apply to monitoring $L_2$ and $L_2^2$ of arbitrary nonnegative vectors, which is at the heart of many practical computations such as join size, wavelet and histogram representations, geometric problems and so on. See G. Cormode and M. Garofalakis, "Sketching streams through the net: Distributed approximate query tracking," *Intl. Conf. Very Large Data Bases,* 2005; and P. Indyk, "Algorithms for dynamic geometric, problems over data streams," *ACM Symp. Theory of Computing,* 2004. Likewise, our $F_1$ techniques are applicable to continuously track quantiles and heavy hitters of time-varying distributions. See G. Cormode, M. Garofalakis, S. Muthukrishnan, and R. Rastogi, "Holistic aggregates in a networked world: Distributed tracking of approximate quantiles," *ACM SIGMOD Intl. Conf. Management of Data,* 2005.

What is claimed is:

1. A method of monitoring computer network activity comprising:
reporting a selected network activity by a plurality of remote devices using a frequency moment $F_p$ determined in accordance with $$F_p = \Sigma_i m_i^p$$

where p represents an order of the frequency moment of 0, 1, or 2, i representing the selected network activity, and $m_i$ representing a dataset comprising a frequency associated with the selected network activity i from the plurality of remote devices; and
providing a notification in response to $F_p \geq \tau$, where $\tau$ is a threshold value in response to the order of the frequency moment being 2, the frequency moment $F_2$ being calculated in two phases of rounds, sketch algorithms being calculated to determine an estimate of a current norm of vectors, the plurality of remote devices sending a bit to a coordinator in response to a local vector exceeding a pre-determined bit threshold, the sketches being collected from each of the plurality of remote devices in response to receiving a pre-determined number of bits;
causing the estimate of the current frequency moment $F_2$ to exceed a pre-determined fraction of a global threshold in response to a summation of the sketches,
dividing each round into sub-rounds, where each sub-round is completed on the receipt of a pre-determined threshold of a number of bits;
transmitting an approximate sketch to the coordinator on the completion of each sub-round;
initiating a new sub-round in response to the approximate sketch being less than a pre-defined threshold;
changing an output value of the coordinator; and
terminating the algorithm in response to the approximate sketch being equal to or exceeding the pre-defined threshold.

2. The method of claim 1, wherein p=0 and $F_0$ corresponds to the number of distinct elements in dataset $m_i$.

3. The method of claim 1, wherein p=1 and $F_1$ corresponds to the sum of all elements in dataset $m_i$.

4. The method of claim 1, wherein p=2 and $F_2$ corresponds to the square of the frequency of each element in dataset $m_i$.

5. The method of claim 1, wherein the coordinator collects information from the plurality of remote devices at the end of each round which summarizes the data received at the plurality of remote devices.

6. The method of claim 5, wherein the information collected by the coordinator comprises a sum or sketch of data values.

7. The method of claim 5, wherein the coordinator determines that the global threshold has been reached based on a combination of summaries.

8. The method of claim 1, wherein each of the plurality of remote devices device monitors a function associated with the network activity and a function of a device connected to the network, and sends a bit to the coordinator when the value of the function increases above a pre-determined threshold.

9. The method of claim 1, where the plurality of remote devices monitor a function of the network activity and a function of a device connected to the network; where the plurality of remote devices send a bit to the coordinator in response to the value of the function increasing above a pre-determined threshold, the coordinator completing a round after receiving a pre-determined number of bits from the plurality of remote devices, the coordinator collecting information from the plurality of remote devices at the end of each round, the information summarizing the data received at the plurality of remote devices, the summary information comprising a sum or sketch of data values, the coordinator determining that a global threshold has been reached based on a combination of summaries.

10. The method of claim 1 for monitoring $F_1$, the plurality of remote devices waiting until a pre-determined number of elements are received and then simulating the tossing of a biased coin, with true randomness or with a pseudo-random number generator, the plurality of remote devices sending a bit to the coordinator in response to the result of the coin toss being heads; the coordinator determining that a global threshold has been reached in response to receiving a pre-determined quantity of bits from the remote devices.

11. The method of claim 1, wherein the frequency moment is $F_0$, the frequency moment calculation proceeding in a single round, the plurality of remote devices randomly selecting one of two hash functions;
the plurality of remote device evaluating the selected hash function based on data received associated with the selected network activity, the second hash function being evaluated in response to certain criteria are met in the first hash function;
the hash value being sent to the coordinator in response to being initially observed by the remote site; and
(c) the central coordinator reporting that a global threshold has been reached in response to the number of distinct hash values received exceeding a pre-determined number.

12. The method of claim 1, wherein the frequency moment is $F_2$, $F_2$ not exceeding a certain fraction of the global threshold at the completion of the first phase, and where, during the second phase, $F_2$ monitoring until it is within a certain range of the global threshold.

13. A method of monitoring computer network activity comprising:
reporting a selected network activity by a plurality of remote devices using a frequency moment $F_p$ determined in accordance with $$F_p = \Sigma_i m_i^p$$

where p represents an order of the frequency moment of 0, 1, or 2, i representing the selected network activity, and $m_i$ representing a dataset comprising a frequency associated with the selected network activity i from the plurality of remote devices; and providing a notification in response to $F_p \geq \tau$, where $\tau$ is a threshold value, wherein the frequency moment is $F_2$, the frequency moment calculation proceeding in two phases of rounds, comprising
  (a) a first phase with one sub-round per round, wherein a coordinator collects sketches from each device with a communication cost based on the number of devices;
    (i) the coordinator ends the round and computes a new threshold of sketches required to end a round, in response to the number of sketches equaling or exceeding a pre-determined threshold;
    (ii) the calculation proceeding to phase two in response to the new threshold equaling or exceeding the previous threshold by a predetermined fraction, otherwise another round of the first phase is performed; and
    (iii) first phase rounds are performed until the threshold permits advancing to the second phase; and
  (b) a second phase wherein the coordinator collects sketches from remote sites with a communication cost based on the number of remote devices divided by an error factor; and where
    (i) the remote sites continuously monitor the selected activity, and transmit sketches to the coordinator in response to the activity exceeding a pre-defined threshold; and
    (ii) when the server receives a number of sketches equal to the number of remote devices, a sub-round is completed and the remote sites transmit an approximate sketch to the coordinator;
    (iii) the coordinator starts a new sub-round in response to the approximate sketch being less than or equal to a pre-defined threshold;
    (iv) the coordinator ending the round in response to the approximate sketch being greater than a pre-defined threshold, and the coordinator setting an output value to 1 and the method terminating in response to the number of sketches exceeding the threshold of sketches required to end the algorithm.

14. The method of claim 13, wherein the pre-determined fraction in steps (a)(i) and (a)(ii) is greater than 1.

15. A non-transient computer-readable storage medium storing instructions that, when executed by a processor, cause the processor to:
  report a selected network activity by a plurality of remote devices using a frequency moment $F_p$ determined in accordance with $$F_p = \Sigma_i m_i^p$$

where p represents an order of the frequency moment of 0, 1, or 2, i representing the selected network activity, and $m_i$ representing a dataset comprising a frequency associated with the selected network activity i from the plurality of remote devices; and
  provide a notification in response to $F_p \geq \tau$, where $\tau$ is a threshold value in response to the order of the frequency moment being 2, the frequency moment $F_2$ being calculated in two phases of rounds, sketch algorithms being calculated to determine an estimate of a current norm of vectors, the plurality of remote devices sending a bit to a coordinator in response to a local vector exceeding a pre-determined bit threshold, the sketches being collected from each of the plurality of remote devices in response to receiving a pre-determined number of bits;
  cause the estimate of the current frequency moment $F_2$ to exceed a pre-determined fraction of a global threshold in response to a summation of the sketches;
  divide each round into sub-rounds, where each sub-round is completed on the receipt of a pre-determined threshold of a number of bits;
  transmit an approximate sketch to the coordinator on the completion of each sub-round;
  initiate a new sub-round in response to the approximate sketch being less than a pre-defined threshold;
  initiate a change in an output value of the coordinator; and
  terminate the algorithm in response to the approximate sketch being equal to or exceeding the pre-defined threshold.

16. The computer readable storage medium defined by claim 15, storing instructions that, when executed by a processor, cause the coordinator to collect information from the plurality of remote devices at the end of each round which summarizes data received at the plurality of remote devices.

17. The computer readable storage medium defined by claim 16, wherein the information collected by the coordinator comprises a sum or sketch of data values.

18. The computer readable storage medium defined by claim 16, wherein the coordinator determines that the global threshold has been reached based on a combination of summaries.

19. The computer readable storage medium defined by claim 15, storing instructions that, when executed by a processor, cause each of the plurality of remote devices to monitor a function associated with the network activity and a function of a device connected to the network, and send a bit to the coordinator when the value of the function increases above a pre-determined threshold.

20. The computer readable storage medium defined by claim 19, storing instructions that, when executed by a processor, cause the coordinator to complete a round after receiving a pre-determined number of bits from the plurality of remote devices, the coordinator collecting information from the plurality of remote devices at the end of each round, the information summarizing the data received at the plurality of remote devices, the summary information comprising a sum or sketch of data values, the coordinator determining that a global threshold has been reached based on a combination of summaries.

* * * * *